United States Patent
Shakagoori et al.

(10) Patent No.: US 9,890,466 B2
(45) Date of Patent: Feb. 13, 2018

(54) METHOD FOR PRODUCING MOLD FOR NANOIMPRINTING AND ANTI-REFLECTIVE ARTICLE

(71) Applicant: Mitsubishi Rayon Co., Ltd., Tokyo (JP)

(72) Inventors: Shinya Shakagoori, Yokohama (JP); Hiroshi Onomoto, Otake (JP); Makoto Ookawa, Yokohama (JP); Kazuya Takanashi, Yokohama (JP); Katsumi Hara, Yokohama (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/911,413

(22) PCT Filed: Aug. 8, 2014

(86) PCT No.: PCT/JP2014/071023
§ 371 (c)(1),
(2) Date: Feb. 10, 2016

(87) PCT Pub. No.: WO2015/022916
PCT Pub. Date: Feb. 19, 2015

(65) Prior Publication Data
US 2016/0194778 A1    Jul. 7, 2016

(30) Foreign Application Priority Data
Aug. 14, 2013    (JP) ................................. 2013-168539

(51) Int. Cl.
B29D 11/00    (2006.01)
C25D 11/16    (2006.01)
(Continued)

(52) U.S. Cl.
CPC ............ *C25D 11/16* (2013.01); *B29C 59/046* (2013.01); *C25D 11/08* (2013.01); *C25D 11/10* (2013.01);
(Continued)

(58) Field of Classification Search
CPC ... G02B 1/00; G02B 1/10; G02B 1/11; G02B 1/118; B29C 33/00; B29C 33/38;
(Continued)

(56) References Cited

U.S. PATENT DOCUMENTS

2006/0234396 A1    10/2006   Tomita et al.
2009/0194914 A1    8/2009   Uozu et al.
(Continued)

FOREIGN PATENT DOCUMENTS

CN    102803574 A    11/2012
JP    2007-030146 A    2/2007
(Continued)

OTHER PUBLICATIONS

Office Action dated Sep. 1, 2016, for Chinese Application No. 201480044824.7, together with English language translation thereof.
(Continued)

*Primary Examiner* — Arnel C Lavarias
(74) *Attorney, Agent, or Firm* — Fitch, Even, Tabin & Flannery, LLP (57) ABSTRACT

This method for producing a mold for nanoimprinting in which a minute bumpy structure has been formed at the surface of a roller-shaped aluminum substrate of which the surface has been machined has: a polishing step for mechanically polishing the surface of the roller-shaped aluminum substrate, of which the surface has been machined, at least until the average crystal grain size changes; and a minute bumpy structure formation step for
(Continued)

anodizing the aluminum substrate after the polishing step and forming a minute bumpy structure. The anti-reflective article has a minute bumpy structure at the surface, and in the wavelength region of visible light, has a color difference (E*) to the origin represented in the L*a*b* color system and derived by means of formula (1) of no greater than 0.9, or a chroma (C*) determined by means of formula (2) of no greater than 0.7.

$$E^* = \{(L^*)^2 + (a^*)^2 + (b^*)^2\}^{1/2} \quad (1)$$

$$C^* = \{(a^*)^2 + (b^*)^2\}^{1/2} \quad (2)$$

11 Claims, 3 Drawing Sheets

(51) Int. Cl.
| | | |
|---|---|---|
| G02B 1/118 | (2015.01) | |
| B29C 59/04 | (2006.01) | |
| C25D 11/08 | (2006.01) | |
| C25D 11/10 | (2006.01) | |
| C25D 11/12 | (2006.01) | |
| G02B 1/111 | (2015.01) | |
| G02B 27/00 | (2006.01) | |
| G02B 1/12 | (2006.01) | |
| G02B 5/02 | (2006.01) | |
| B29C 59/02 | (2006.01) | |
| B29C 33/38 | (2006.01) | |

(52) U.S. Cl.
CPC .............. *C25D 11/12* (2013.01); *G02B 1/111* (2013.01); *G02B 1/118* (2013.01); *G02B 27/0006* (2013.01); *B29C 33/3842* (2013.01); *B29C 2059/023* (2013.01); *G02B 1/12* (2013.01); *G02B 5/0294* (2013.01)

(58) Field of Classification Search
CPC . B29C 33/3814; B29C 33/3842; B29C 59/00; B29C 59/02
USPC .... 264/1.1, 1.36, 1.38, 2.1, 2.5, 41, 48, 165, 264/166, 219; 359/577, 580, 581, 582, 359/601, 609
See application file for complete search history.

(56) References Cited

U.S. PATENT DOCUMENTS

| | | | |
|---|---|---|---|
| 2010/0243458 A1 | 9/2010 | Kojima et al. | |
| 2010/0258978 A1 | 10/2010 | Yamada et al. | |
| 2011/0157704 A1 | 6/2011 | Sato et al. | |
| 2012/0058216 A1 | 3/2012 | Ihara | |
| 2012/0171427 A1 | 7/2012 | Kita et al. | |
| 2012/0218639 A1* | 8/2012 | Minoura | B29C 33/424 359/601 |
| 2012/0318772 A1* | 12/2012 | Minoura | C25D 11/12 216/52 |
| 2015/0140268 A1* | 5/2015 | Ikawa | C25D 11/12 428/141 |
| 2016/0200006 A1* | 7/2016 | Shakagoori | C25D 11/04 216/88 |

FOREIGN PATENT DOCUMENTS

| | | |
|---|---|---|
| JP | 2010-253819 A | 11/2010 |
| JP | 2010-253820 A | 11/2010 |
| JP | 2012-137534 A | 7/2012 |
| WO | 2008/001847 A1 | 1/2008 |
| WO | 2009/054513 A1 | 4/2009 |
| WO | 2009/107294 A1 | 9/2009 |
| WO | 2009/145049 A1 | 12/2009 |
| WO | 2010/128662 A1 | 11/2010 |
| WO | 2011/030850 A1 | 3/2011 |

OTHER PUBLICATIONS

International Search Report for PCT/JP2014/071023 dated Sep. 16, 2014; English translation submitted herewith (4 pages).
Office Action dated Sep. 5, 2017, for Japanese Application No. 2014-539936, together with English language translation (from Global Dossier) thereof.
Decision to grant patent, dated Nov. 28, 2017, for Japanese Application No. 2014-539936, together with English language translation (from Global Dossier) thereof.

* cited by examiner

METHOD FOR PRODUCING MOLD FOR NANOIMPRINTING AND ANTI-REFLECTIVE ARTICLE

CROSS-REFERENCE TO RELATED APPLICATIONS

This application is a U.S. national phase application filed under 35 U.S.C. § 371 of International Application No. PCT/JP2014/071023, filed Aug. 8, 2014, designating the United States, which claims priority from Japanese Patent Application 2013-168539 filed on Aug. 14, 2013, which are all hereby incorporated herein by reference in their entirety for all purposes.

TECHNICAL FIELD

The present invention relates to a method for producing a mold for nanoimprinting having a concave-convex microstructure formed by a plurality fine pores on a surface thereof, and an anti-reflective article.

BACKGROUND ART

Recently, an article, such as a film, which has a concave-convex microstructure with a period that is equal to or less than the wavelength of visible light on a surface thereof has been known to exhibit an antireflection effect, a lotus effect, and the like. In particular, a concave-convex structure referred to as a moth-eye structure is known to serve as an effective antireflection means since a refractive index continuously increases from the refractive index of air to the refractive index of the material of the article.

As a method of forming a concave-convex microstructure on a surface of an article, attention is drawn to a method in which a mold having an inverted structure of the concave-convex microstructure formed on the surface thereof is used, a curable resin composition is supplied between the mold and an article main body (substrate) and cured, and the concave-convex microstructure of the mold is transferred to the surface of the article main body (nanoimprinting method).

As a method for producing a mold for nanoimprinting, a method is known in which a step of forming an oxide film having fine pores by anodizing an aluminum substrate in an electrolyte and a step of increasing the fine pores of the oxide film by etching are alternately repeated to form anodized alumina having a plurality of fine pores (concave portions) on the surface of the aluminum substrate.

However, the surface of the aluminum substrate may be mirror-polished by mechanical processing such as cutting processing in some cases.

However, when the machined aluminum substrate is anodized, an oxide film having fine pores non-uniformly dispersed is easily formed. When a mold in a state where fine pores are non-uniformly dispersed is used to transfer the concave-convex microstructure to the surface of the article main body, haze easily increases, and as a result, reflectance also increases.

The reason why the oxide film having fine pores non-uniformly dispersed is formed is considered that an affected layer is formed on the surface of the aluminum substrate by mechanical processing.

As a method for producing a mold in which fine pores are uniformly dispersed even when the machined aluminum substrate is anodized, for example, Patent Document 1 discloses a method of performing cathode electrolysis, electrolytic polishing, or etching on an aluminum substrate before an anodizing step. In the method described in Patent Document 1, a fine concave-convex structure is formed on an affected layer by cathode electrolysis, electrolytic polishing, or etching, and an oxide film having fine pores more uniformly dispersed is formed using these concave portions by anodization. Further, in Patent Document 1, after the affected layer is removed by cathode electrolysis, electrolytic polishing, or etching, an oxide film can also be formed.

CITATION LIST

Patent Document

Patent Document 1: WO 2010/128662 A

SUMMARY OF THE INVENTION

Problem to be Solved by the Invention

However, the thickness or state of the affected layer is easily changed depending on the purity of the aluminum substrate or the conditions of machine processing. For this reason, in the case of the method of performing anodization after a fine concave-convex structure is formed on an affected layer, it is necessary to change the conditions of cathode electrolysis, electrolytic polishing, or etching to be most suitable conditions depending on the aluminum substrate in each case.

Further, in order to form an oxide film having fine pores uniformly dispersed on the affected layer, it is also necessary for the concave portions of the fine concave-convex structure on the affected layer to be uniformly dispersed. However, there is a limitation on that the fine concave-convex structure in which the concave portions are uniformly dispersed is formed by cathode electrolysis, electrolytic polishing, or etching.

Moreover, the fine concave-convex structure formed on the affected layer may remain even after anodization in some cases, and is also reflected to a transfer article. Therefore, transparency may be affected, for example, haze increases, in some cases.

Further, also in the case of the method of removing the affected layer by cathode electrolysis, electrolytic polishing, or etching, it is considered that a fine concave-convex structure is formed on the surface from which the affected layer is removed. For this reason, as described above, this fine concave-convex structure may remain even after anodization in some cases.

The invention is made in the light of the above circumstances. The invention provides a method for easily producing a mold for nanoimprinting by which an oxide film having fine pores uniformly dispersed can be formed and an article with low haze can be obtained, and an anti-reflective article.

Means for Solving Problem

The invention has the following features.
<1> A method for producing a mold for nanoimprinting, the mold having a concave-convex microstructure formed on a surface of a roll-shaped aluminum substrate in which the surface has been machined, the method including: a polishing step of mechanically polishing the surface of the roll-shaped aluminum substrate in which the surface has been machined until at least an average crystal grain size changes; and a concave-convex microstructure forming step of forming a concave-convex microstructure by anodizing the aluminum substrate after the polishing step.

<2> The method for producing a mold for nanoimprinting described in <1>, in which the surface of the aluminum substrate is mechanically polished in the polishing step until the average crystal grain size becomes 1 μm or more.

<3> The method for producing a mold for nanoimprinting described in <2>, in which the surface of the aluminum substrate is mechanically polished in the polishing step until the average crystal grain size becomes 5 μm or more.

<4> The method for producing a mold for nanoimprinting described in any one of <1> to <3>, in which the surface of the aluminum substrate is removed by a thickness of 1 μm or more in the polishing step.

<5> The method for producing a mold for nanoimprinting described in <4>, in which the surface of the aluminum substrate is removed by a thickness of 3 μm or more in the polishing step.

<6> The method for producing a mold for nanoimprinting described in any one of <1> to <5>, further including a surface finishing step of finishing the surface of the roll-shaped aluminum substrate at the same time of the polishing step or between the polishing step and the concave-convex microstructure forming step.

<7> The method for producing a mold for nanoimprinting described in any one of <1> to <6>, in which chemical mechanical polishing is performed in the polishing step.

<8> The method for producing a mold for nanoimprinting described in any one of <1> to <7>, in which a purity of at least the surface of the aluminum substrate is 99% or more.

<9> The method for producing a mold for nanoimprinting described in any one of <1> to <8>, in which in the concave-convex microstructure forming step, an anodizing step of anodizing the aluminum substrate to form fine pores and a fine pore diameter-increasing step of increasing the diameters of the fine pores by dissolving at least a part of the fine pores are repeatedly performed.

<10> The method for producing a mold for nanoimprinting described in <9>, in which a treatment time of the anodization is shorter than 5 minutes.

<11> The method for producing a mold for nanoimprinting described in <9> or <10>, in which the number of repetitions of the anodizing step and the fine pore diameter-increasing step is 15 or less in total.

<12> An anti-reflective article comprising a concave-convex microstructure on a surface thereof, in which in a wavelength region of visible light, a color difference (E*) with the origin represented by an L*a*b* color system, which is obtained by the following formula (1), is 0.9 or less, $$E^* = \{(L^*)^2 + (a^*)^2 + (b^*)^2\}^{1/2} \quad (1).$$

<13> An anti-reflective article comprising a concave-convex microstructure on a surface thereof, in which in a wavelength region of visible light, a chroma (C*) obtained by the following formula (2) from values of a* and b* which are measured by an L*a*b* color system is 0.7 or less, $$C^* = \{(a^*)^2 + (b^*)^2\}^{1/2} \quad (2).$$

<14> The anti-reflective article described in <12> or <13>, in which in the wavelength region of visible light, a difference (Δλ) between a maximum value and a minimum value of reflectance with respect to incident light is 0.2% or less.

<15> The anti-reflective article described in any one of <12> to <14>, in which the concave-convex microstructure is formed by a plurality of protrusions having an average period of 400 nm or less.

Effect of the Invention

According to the method for producing a mold for nanoimprinting of the invention, it is possible to easily produce a mold for nanoimprinting by which an oxide film having fine pores uniformly dispersed can be formed and an article with low haze can be obtained.

In addition, the anti-reflective article of the invention has low haze.

MODE(S) FOR CARRYING OUT THE INVENTION

In this specification, the term "fine pores" indicates concave portions of a concave-convex microstructure which is formed on an oxide film of a surface of an aluminum substrate.

Further, the term "concave-convex microstructure" means a structure in which an average interval (period) between adjacent convex portions or between concave portions is nanoscale.

Further, the term "visible light" means light with the wavelength of 400 nm or more but 780 nm or less.

Further, the expression "equal to or less than the wavelength of visible light" means that the wavelength is less than the shortest use wavelength among light beams having the wavelength in the above range. That is, when an article having a concave-convex microstructure with a period "equal to or less than the wavelength of visible light" is used for antireflection application of visible light, the use wavelength becomes 400 to 780 nm. Therefore, the period of the concave-convex microstructure in this case becomes 400 nm or less that is the shortest wavelength of the use wavelength. Further, when an article having a concave-convex microstructure with a period "equal to or less than the wavelength of visible light" is used for antireflection application of blue light, the use wavelength becomes 460 nm. Therefore, the period of the concave-convex microstructure in this case becomes 460 nm or less.

"Method for Producing Mold for Nanoimprinting"

The method for producing a mold for nanoimprinting (hereinafter, also simply referred to as a "mold") of the invention is a method for producing a mold having a concave-convex microstructure formed on a surface thereof by anodizing a roll-shaped aluminum substrate in which the surface has been machined. When an article manufactured by using the obtained mold is used for antireflection application, the concave-convex microstructure is preferably a concave-convex microstructure with a period equal to or less than the wavelength of visible light.

The method for producing a mold of the invention includes a polishing step and a concave-convex microstructure forming step which will be described later. Further, the method for producing a mold preferably includes a surface finishing step at the same time of the polishing step or between the polishing step and the concave-convex microstructure forming step.

Hereinafter, an embodiment of the method for producing a mold of the invention will be described in detail.

<Polishing Step>

The polishing step is a step of mechanical polishing the surface (hereinafter, also referred to as a "processed surface") of the roll-shaped aluminum substrate in which the surface has been machined until at least an average crystal grain size changes.

When the surface of the aluminum substrate is machined, it is known that an affected layer is formed on the surface thereof. It is considered that the affected layer is formed in such a manner that the surface is melted by local friction heat at the time of machine processing and then the surface is cooled to be recrystallized.

Herein, the term "machine processing" means that the surface of the aluminum substrate is ground or cut to be mirror-polished.

The aluminum substrate to be machined preferably has a purity of 99% or more on at least the surface (specifically, a portion having a thickness of 100 µm), more preferably a purity of 99.5%, and particularly preferably a purity of 99.9% or more. As the purity of aluminum increases, the formation of the concave-convex structure having such a size that visible light is scattered by segregation of impurities at the time of anodization can be suppressed. In addition, the regularity of fine pores obtained by anodization tends to be improved.

The affected layer is usually configured by a plurality of layers having crystal grains each having a different size. The size of the crystal grain of each layer tends to decrease as the layer approaches to the processed surface of the aluminum substrate.

In the invention, among affected layers, a layer having crystal grains with an average crystal grain size of less than 1 µm is designated as a first affected layer, a layer having crystal grains with an average crystal grain size of 1 µm or more but less than 30 µm is designated as a second affected layer, and a layer having crystal grains with an average crystal grain size of 30 µm or more but less than 50 µm is designated as a third affected layer. The first affected layer is a layer positioned at the outermost surface layer of the affected layer, and the affected layer in which the first affected layer, the second affected layer, and the third affected layer are superimposed in order from the upper side is formed on the processed surface of the aluminum substrate.

The thickness of the affected layer is not determined categorically since the thickness thereof is changed depending on the purity of the aluminum substrate or the conditions of machine processing, but the thickness thereof is generally set to about several hundred µm. That is, a distance from the processed surface of the aluminum substrate to an interface between the third affected layer and a portion which is not affected by processing is about several hundred µm. Further, a distance from the processed surface of the aluminum substrate to an interface between the first affected layer and the second affected layer is about 1 to 5 µm, and a distance from the processed surface of the aluminum substrate to an interface between the second affected layer and the third affected layer is about 5 to 10 µm.

In the polishing step, the surface of the roll-shaped aluminum substrate in which the surface has been machined is mechanically polished until at least an average crystal grain size changes.

Herein, the expression "mechanically polished until an average crystal grain size changes" means that the processed surface of the aluminum substrate is mechanically polished until the average crystal grain size of the processed surface of the aluminum substrate changes from less than 1 µm to 1 µm or more, preferably to 5 µm or more. That is, in the polishing step, the mechanical polishing is performed until at least the first affected layer is removed.

The average crystal grain size is an average value of diameters of a hypothetical circle calculated for 100 or more crystal grains arbitrary selected from the processed surface of the aluminum substrate or the surface of the aluminum substrate after the polishing step. The observation of crystal grains on the surface can be carried out with an optical microscope or the like, and the average value of diameters of a hypothetical circle is obtained, for example, by using an image analysis software "Image-Pro PLUS" produced by Nippon Roper K.K.

As described above, the reason why the oxide film having fine pores non-uniformly dispersed is formed is considered that the affected layer is formed on the surface of the aluminum substrate due to machine processing. In particular, when an oxide film is formed on the first affected layer having crystal grains with an average crystal grain size of less than 1 µm, the fine pores are non-uniformly dispersed.

In the invention, since at least the first affected layer is removed in the polishing step, it is possible to form an oxide film having fine pores uniformly dispersed.

In the polishing step, the removal up to the region of the second affected layer or the third affected layer may be performed. Specifically, the thickness of a portion which is removed from the processed surface of the aluminum substrate by polishing (polishing thickness) is preferably 1 µm or more, more preferably 3 µm or more, further preferably 5 µm or more, particularly preferably 7 µm or more, and most preferably 9 µm or more. In particular, from the viewpoint of easily forming an oxide film having fine pores more uniformly dispersed, it is preferable to remove the whole second affected layer. That is, it is preferable that the processed surface of the aluminum substrate be mechanically polished until the average crystal grain size of the processed surface of the aluminum substrate changes from less than 1 µm to 30 µm or more.

Incidentally, also for the third affected layer, as the thickness of the layer decreases, an oxide film having fine pores more uniformly dispersed is easily formed. Therefore, it is most preferable that the whole third affected layer be removed, that is, the processed surface of the aluminum substrate be mechanically polished until the average crystal grain size of the processed surface of the aluminum substrate changes from less than 1 µm to 50 µm or more. However, the distance from the processed surface of the aluminum substrate to an interface between the third affected layer and a portion which is not affected by processing is about several hundred µm, and thus the removal of the whole third affected layer requires time and effort. The third affected layer is less likely to be influenced by the distribution of the fine pores of the oxide film as compared with the first affected layer and the second affected layer. Therefore, if the whole third affected layer is not removed, it is possible to form an oxide film having fine pores uniformly dispersed.

In the polishing step, at least the processed surface of the aluminum substrate is mechanically polished.

Herein, the term "mechanical polishing" means that the processed surface is physically polished so as to be mirror-polished. In the invention, physical polishing also includes "tape polishing" and "chemical mechanical polishing (CMP polishing)." In particular, the processed surface of the aluminum substrate is preferably polished by CMP polishing.

A method of polishing the processed surface of the aluminum substrate by mechanical polishing is not particularly limited, and a well-known method can be employed. Further, a well-known polishing apparatus can also be used.

In the polishing step, only mechanical polishing may be performed or may be performed together with another treatment method.

Examples of another treatment method include etching, electrolytic polishing, and chemical polishing.

When the mechanical polishing is performed together with another treatment method, there is no limitation on the order thereof, but it is preferable that after the processed surface of the aluminum substrate is treated by another treatment method to some extent, mechanical polishing be performed until the average crystal grain size changes. When mechanical polishing is performed after another treatment method, it is possible to obtain the surface of the aluminum substrate, which is further mirror-polished, after the polishing step.

However, in consideration of the removing time and workability, in the polishing step, it is preferable to perform only mechanical polishing.

Figure 1:
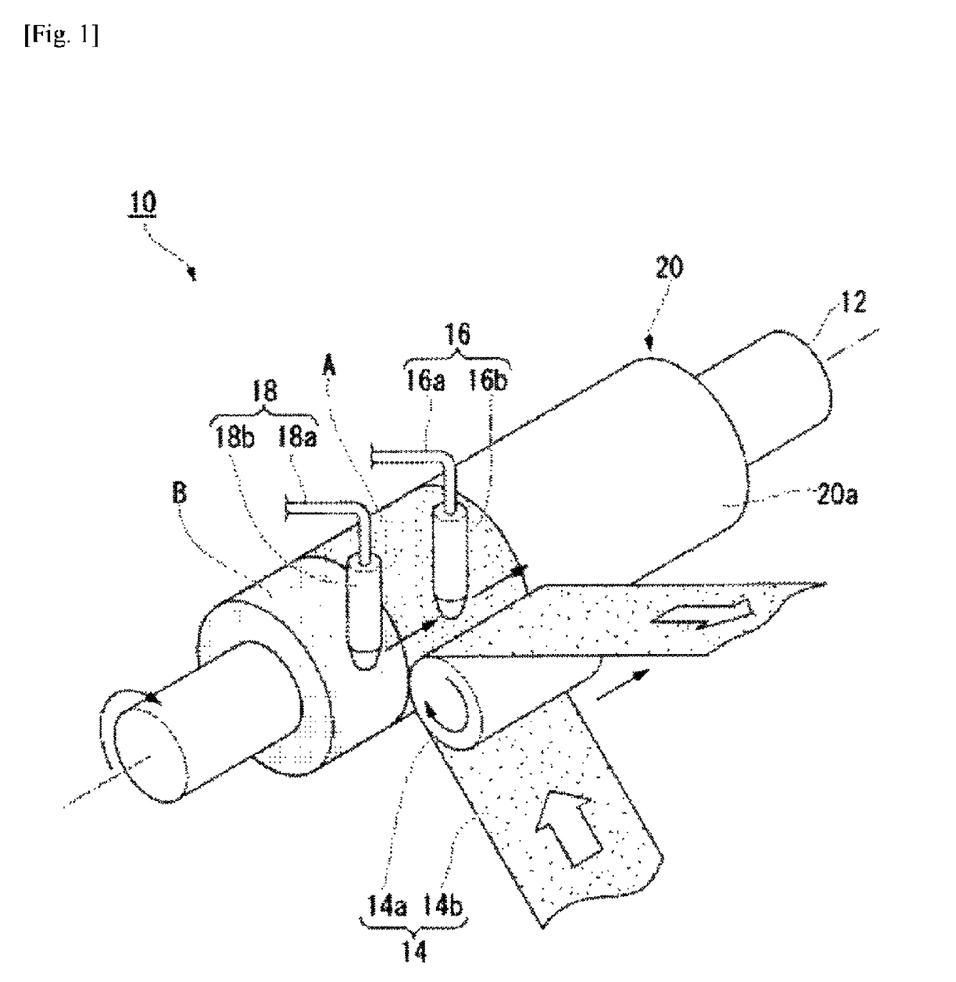
FIG. 1 is a perspective view illustrating an example of a polishing apparatus which is used in the invention.

Hereinafter, an example of a method of polishing the processed surface of the aluminum substrate by CMP polishing will be described with reference to the drawing.

FIG. 1 is a perspective view illustrating an example of a polishing apparatus used in the invention.

A polishing apparatus 10 of this example is used to polish the processed surface of a hollow roll-shaped aluminum substrate 20 and is schematically configured to include a shaft 12, a polishing means 14, a slurry supplying means 16, and a washing means 18.

In the aluminum substrate 20, the roll-shaped shaft 12 is provided to penetrate through the aluminum substrate 20 such that the axial direction of the shaft is set to be the same as the axial direction of the aluminum substrate 20.

Further, the aluminum substrate 20 is supported on a support shaft (not illustrated), and the support shaft is rotated by a rotary driving portion (not illustrated), such as a motor, connected to the support shaft so that the aluminum substrate 20 can be rotated.

The polishing means 14 includes a polishing roll 14a and a belt-shaped coated abrasive 14b.

The polishing roll 14a is used to polish an outer peripheral surface 20a of the aluminum substrate 20 by bringing the coated abrasive 14b into press contact with the outer peripheral surface (processed surface) 20a of the aluminum substrate 20.

The polishing roll 14a is connected to the rotary driving portion (not illustrated) such as a motor and is rotatable.

The coated abrasive 14b is formed by attaching a polishing material to a substrate (cloth or paper). The coated abrasive 14b is preferably formed in a belt shape in such a manner that the polished surface faces outward and both ends in the longitudinal direction are bonded to each other.

As the coated abrasive 14b, a commercially available product can be used.

The polishing means 14 can be movable along the longitudinal direction of the aluminum substrate 20.

The slurry supplying means 16 is used to supply a slurry between the aluminum substrate 20 and the coated abrasive 14b and includes a slurry supplying pipe 16a and a nozzle 16b.

One end of the slurry supplying pipe 16a is connected to a tank (not illustrated) or the like storing a slurry and the other end thereof is connected to the nozzle 16b.

The slurry supplying means 16 is movable along the longitudinal direction of the aluminum substrate 20 in synchronization with the movement of the polishing means 14.

The washing means 18 is used to wash the outer peripheral surface 20a of the aluminum substrate 20 after polishing and includes a washing liquid supplying pipe 18a and a nozzle 18b.

One end of the washing liquid supplying pipe 18a is connected to a tank (not illustrated) or the like storing a washing liquid and the other end thereof is connected to the nozzle 18b.

The washing means 18 is movable along the longitudinal direction of the aluminum substrate 20 in synchronization with the movement of the polishing means 14 and the slurry supplying means.

The method of polishing the aluminum substrate 20 by using the polishing apparatus 10 is as follows.

First, a rotary driving portion (not illustrated) is driven in a state where the shaft 12 penetrates through the aluminum substrate 20 so as to rotate a support shaft (not illustrated), thereby rotating the aluminum substrate 20.

Separately, the rotary driving portion (not illustrated) is driven in a state where the belt-shaped coated abrasive 14b is attached to the polishing roll 14a so that the polishing roll 14a is rotated in the same direction as the rotation direction of the aluminum substrate 20. The belt-shaped coated abrasive 14b is also rotated in synchronization with the rotation of the polishing roll 14a.

While the aluminum substrate 20 and the polishing roll 14a are rotated, the coated abrasive 14b is brought into press contact with the outer peripheral surface 20a of the aluminum substrate 20. Then, a slurry is supplied from the slurry supplying means 16 between the coated abrasive 14b and the outer peripheral surface 20a of the aluminum substrate 20 to polish the outer peripheral surface (processed surface) 20a of the aluminum substrate 20.

The region A to be polished is moved to the longitudinal direction of the aluminum substrate 20 by moving the polishing means 14 and the slurry supplying means 16 along the longitudinal direction of the aluminum substrate 20 so as to polish the whole outer peripheral surface 20a of the aluminum substrate 20.

The washing means 18 is also moved in synchronization with the movement of the polishing means 14 and the slurry supplying means 16, and a washing liquid is supplied from the washing means 18 to the region which had been polished (polished region) B so that the slurry attached to the outer peripheral surface 20a of the aluminum substrate 20 is removed.

At the time of supplying a slurry, a slurry may also be intermittently supplied by opening/closing the nozzle 16b in conjunction with a timer.

Further, after polishing is finished from one end to the other end of the aluminum substrate 20 in the longitudinal direction, polishing may be further continued from the other end to one end of the aluminum substrate 20 by moving (traversing) the polishing means 14 and the slurry supplying means 16 in the reverse direction. Moreover, the polishing means 14 and the slurry supplying means 16 may be returned to one end of the aluminum substrate 20, and then polishing may also be performed by moving the polishing means 14 and the slurry supplying means 16 again from one end to the other end.

Incidentally, the washing means 18 may be disposed at the downstream in the moving direction of the polishing means 14 and the slurry supplying means 16, and the polishing apparatus 10 illustrated in FIG. 1 includes one washing means 18. However, in a case where polishing is performed by traversing the polishing means 14 and the slurry supplying means 16, the washing means 18 may also be disposed at the opposite side with the slurry supplying means 16 interposed therebetween.

As a slurry used for polishing (polishing slurry), any slurry may be appropriately selected depending on various objects such as removal of flaws formed on the outer peripheral surface of the aluminum substrate and mirror polishing of the outer peripheral surface, and a well-known polishing slurry used in polishing of the surface of the aluminum substrate can be used.

Examples of the slurry include a slurry containing a polishing material such as SiC, $Al_2O_3$, $SiO_2$, or $ZrO_2$; and a CMP slurry for CMP polishing in which a polishing material is dispersed in a solution having an effect of corroding aluminum.

Examples of the washing liquid include water, alcohol, and an acidic or alkaline solution neutralizing a polishing slurry.

<Surface Finishing Step>

The surface finishing step is a step of finishing the surface of the roll-shaped aluminum substrate.

Herein, the expression "finishing the surface" means that the surface of the aluminum substrate is mirror-polished until the arithmetic mean roughness thereof becomes 15 nm or less.

As a method of finishing the surface of the aluminum substrate, CMP polishing is particularly preferable. When the surface of the aluminum substrate is finished by CMP polishing, the polishing apparatus described above in the description of the polishing step can be used. However, in the surface finishing step and the polishing step, it is preferable to use a coated abrasive in which the average particle diameter of abrasive grains in a polishing material or slurry of the coated abrasive is different. Specifically, in the surface finishing step, it is preferable to use a coated abrasive in which the average particle diameter of abrasive grains in a polishing material or slurry of the coated abrasive is smaller than that used in the polishing step.

The surface finishing step is performed at the same time of the above-described polishing step or between the polishing step and the concave-convex microstructure forming step.

When the polishing step and the surface finishing step are performed at the same time, the processed surface of the aluminum substrate is finished until the average crystal grain size changes. For example, when the polishing step and the surface finishing step are performed at the same time by using the polishing apparatus 10 illustrated in FIG. 1, the coated abrasive 14b in which the average particle diameter of abrasive grains in a polishing material or slurry of the coated abrasive is small is used from the beginning. However, when a polishing material or abrasive grain having a small average particle diameter is used, polishing requires time.

In order to complete the polishing step and the surface finishing step in a short time, it is preferable to perform the surface finishing step between the polishing step and the concave-convex microstructure forming step. In the invention, mechanical polishing in the polishing step is called "coarse polishing," and mechanical polishing in the surface finishing step after the polishing step is also called "finish polishing."

When the CMP polishing is performed in both the polishing step and the surface finishing step, the outer peripheral surface (processed surface) 20a of the aluminum substrate 20 is coarsely polished, for example, by using the polishing apparatus 10 illustrated in FIG. 1 until the average crystal grain size changes (polishing step). Subsequently, the coated abrasive 14b is changed to the coated abrasive in which the average particle diameter of abrasive grains in a polishing material and a slurry is small, and the outer peripheral surface 20a of the aluminum substrate 20 is finish-polished (surface finishing step).

<Concave-Convex Microstructure Forming Step>

The concave-convex microstructure forming step is a step of forming the concave-convex microstructure on the surface of the aluminum substrate by anodizing the aluminum substrate after the polishing step or the surface finishing step described above.

In the concave-convex microstructure forming step, an anodizing step of anodizing the aluminum substrate to form fine pores and a fine pore diameter-increasing step of increasing the diameters of the fine pores formed in the anodizing step by dissolving at least a part of the fine pores are repeatedly performed. For example, the concave-convex microstructure forming step preferably includes the following steps (c) to (f). Further, before the step (c), the following step (a) and step (b) may be performed.

(a) A step of forming an oxide film by anodizing an aluminum substrate under a constant voltage in an electrolyte on a surface of the aluminum substrate, (b) a step of removing a part or the whole of the oxide film to form anodized fine pore generation points on the surface of the aluminum substrate, (c) a step of anodizing the aluminum substrate in an electrolyte again to form an oxide film having fine pores at fine pore generation points, after the step (b), (d) a step of increasing the diameters of the fine pores after the step (c), (e) a step of anodizing the aluminum substrate in an electrolyte again, after the step (d), and (f) a step of repeatedly performing the step (d) and the step (e) to obtain a mold in which anodized alumina having a plurality of fine pores is formed on the surface of the aluminum substrate.

Figure 2:
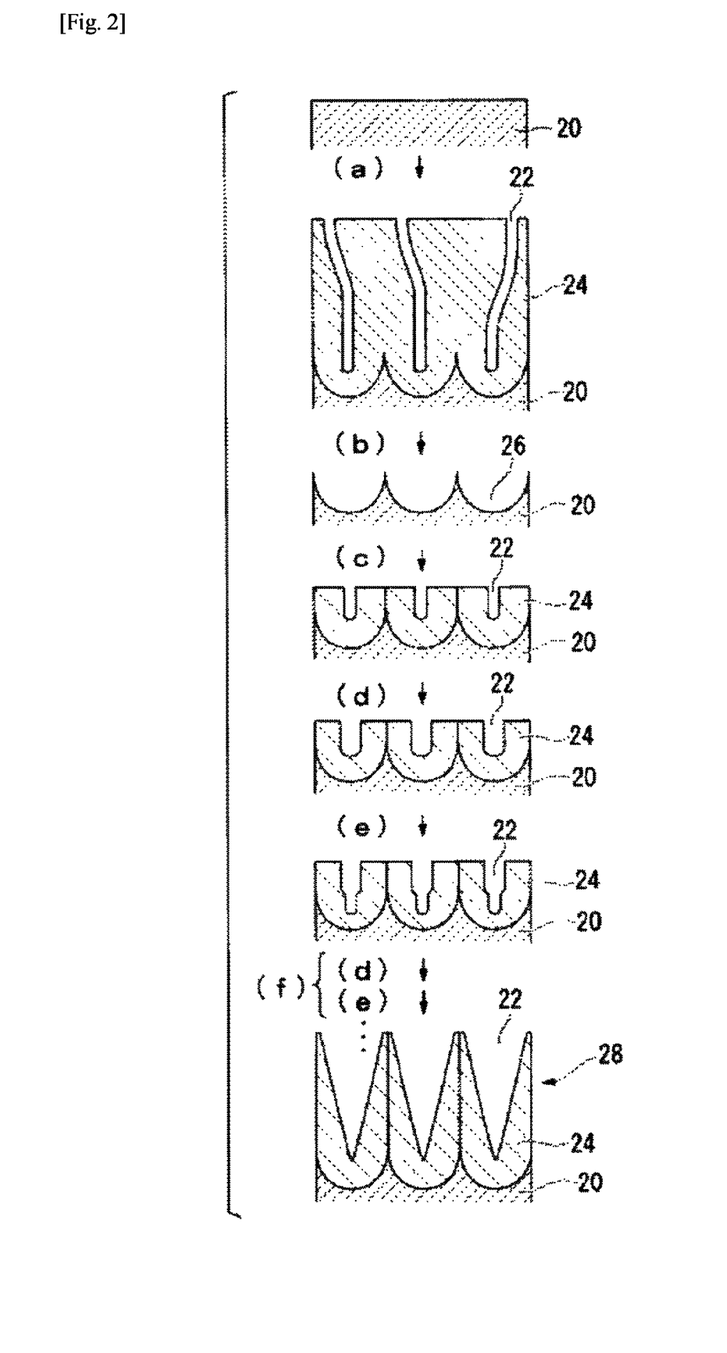
FIG. 2 is a cross-sectional view illustrating a process of producing a mold which has anodized alumina on the surface thereof.

Step (a):

As illustrated in FIG. 2, when the aluminum substrate 20 after the polishing step or the surface finishing step is anodized, an oxide film 24 having fine pores 22 is formed.

As an electrolyte, sulfuric acid, oxalic acid, phosphoric acid, or the like is exemplified.

When oxalic acid is used as an electrolyte:

The concentration of oxalic acid is preferably 0.7 M or less. When the concentration of oxalic acid is more than 0.7 M, a current value is so high that the surface of the oxide film may become coarse.

When a formation voltage is 30 to 60 V, it is possible to obtain an anodized alumina having fine pores with high regularity at periods of 100 nm. When the formation voltage is higher or lower than the above range, there is a tendency for the regularity to decrease.

The temperature of the electrolyte is preferably 60° C. or lower, and more preferably 45° C. or lower. When the temperature of the electrolyte is higher than 60° C., a phenomenon, so-called "burning", occurs and thus, the fine pores are damaged or the regularity of the fine pores is disrupted due to melting of the surface.

When sulfuric acid is used as an electrolyte:

The concentration of sulfuric acid is preferably 0.7 M or less. When the concentration of sulfuric acid is more than 0.7 M, a current value is so high that it may be difficult to maintain a constant voltage.

When a formation voltage is 25 to 30 V, it is possible to obtain anodized alumina having fine pores with high regularity at periods of 63 nm. When the formation voltage is higher or lower than the above range, there is a tendency for the regularity to decrease.

The temperature of the electrolyte is preferably 30° C. or lower, and more preferably 20° C. or lower. When the temperature of the electrolyte is higher than 30° C., a phenomenon, so-called "burning", occurs so that the fine pores are damaged or the regularity of the fine pores is disrupted due to melting of the surface.

Step (b):

As illustrated in FIG. 2, it is possible to improve the regularity of the fine pores by temporally removing a part or the whole of the oxide film 24 to form anodized fine pore generation points 26. Even in a state where a part of the oxide film 24 remains without removing the whole of the oxide film, if portions, which have sufficiently improved regularity, of the oxide film 24 remain, the object of removing the oxide film can be achieved.

As a method of removing the oxide film, a method of removing the oxide film by dissolving the oxide film in a solution that selectively dissolves the oxide film without dissolving aluminum is exemplified. As such a solution, for example, a mixture of chromic acid/phosphoric acid is exemplified.

Step (c):

As illustrated in FIG. 2, when the aluminum substrate 20 with the oxide film removed is anodized again, the oxide film 24 having cylindrical fine pores 22 is formed.

The anodization may be performed under the same conditions as in the step (a). It is possible to obtain deeper fine pores as the anodization is performed for a longer time. However, the voltage of anodization, the types or the temperature of the electrolyte, and the like in the step (c) can be appropriately adjusted in a range that the effect of the step (b) is not lost.

However, when the aluminum substrate was finished by mechanical processing such as cutting as in the related art, since an affected layer remains on the surface of the aluminum substrate, the affected layer may be removed by the anodization of the step (a) and the removal of the oxide film of the step (b) in some cases.

However, when the affected layer is removed by the step (a) and the step (b), it is necessary to perform the anodization of the step (a) for a long time in some cases. When the aluminum substrate is anodized, a level difference between a crystal which is likely to be anodized and a crystal which is less likely to be anodized may be formed, depending on the crystal orientation of the aluminum substrate, in some cases. Such a level difference tends to increase as the treatment time of anodization (anodization time) increases. In particular, since the crystal structure of aluminum with high purity may be relatively large in many cases, when aluminum with high purity is subjected to anodization for a long time, a level difference for each crystal structure may be visually recognized in some cases. Further, if the level difference cannot be visually recognized, the haze of a transfer article may increase or a transfer article may be recognized to be colored.

In the invention, since at least the first affected layer is removed by the polishing step, it is not necessary to remove affected layer by performing anodization for a long time and removing the coated film. Therefore, it the steps (a) and (b) are omitted, it is possible to easily form an oxide film having fine pores uniformly dispersed. When the step (a) and the step (b) are omitted, the anodization time is shortened, and thus it is possible to obtain a mold in which a variation in height of each crystal grain boundary caused by the anodization is minimized. When this mold is used, it is possible to obtain a transfer article with excellent reflectance in the range of visible light and color difference of reflected color. Incidentally, herein, the term "the range of visible light" means that the wavelength of light is in the range of 400 nm to 780 nm.

Further, since it is not necessary to remove the affected layer in the concave-convex microstructure forming step, even when the step (a) and the step (b) are not completely omitted, the anodization time of the step (a) can be shortened. When the anodization time of the step (a) can be shortened, the treatment time of the step (b) can also be shortened. Therefore, as a whole, time required for producing a mold can also be shortened.

In order to produce a mold capable of obtaining a transfer article which is less colored, the anodization time of each of the step (a) and the step (c) is preferably shorter than 5 minutes, more preferably 4 minutes or shorter, and particularly preferably 3 minutes or shorter. When the anodization time is set to be shorter than 5 minutes, an increase in a level difference between crystal grains can be suppressed. Therefore, when the obtained mold is used, the performance of the transfer article, such as the haze and coloring, can be controlled to a favorable range.

Step (d):

As illustrated in FIG. 2, a process of increasing the diameters of the fine pores 22 (hereinafter, referred to as a fine pore diameter-increasing process) is performed. The fine pore diameter-increasing process is a process of increasing the diameters of the fine pores obtained by anodizing the oxide film through immersion in a solution that dissolves the oxide film. As such a solution, for example, a phosphoric acid aqueous solution of about 5% by mass is exemplified.

The longer the fine pore diameter-increasing process is, the larger the fine pore diameter becomes.

Step (e):

As illustrated in FIG. 2, when the aluminum is re-anodized, the cylindrical fine pores 22 with a small diameter which extend downward from the bottom portions of the cylindrical fine pores 22 are further formed.

The anodization may be performed under the same conditions as in the step (c). It is possible to obtain deeper fine pores as the anodization is performed for a longer time.

Step (f):

As illustrated in FIG. 2, when the fine pore diameter-increasing process of the step (d) and the anodization of the step (e) are repeated, the oxide film 24 having fine pores 22 with a shape in which the diameter continuously decreases from an opening portion to a depth direction is formed to obtain a mold 28 having anodized alumina (an aluminum porous oxide film (alumite)) on the surface of the aluminum substrate 20. It is preferable to finish the processes with the step (d) as the final process.

The number of repetitions is preferably three or more in total, and more preferably five or more. When the number of repetitions is two or less, since the diameters of the fine pores decrease discontinuously, the reflectance-reducing effect of the concave-convex microstructure formed by using the anodized alumina having such fine pores is not sufficient.

Further, the number of repetitions of the anodizing step and the fine pore diameter-increasing step is preferably 15 or less in total, and more preferably 10 or less.

The shape of the fine pores 22 may be a substantially conical shape, a pyramidal shape, a cylindrical shape, or the like and it is preferable to have a shape in which the cross-sectional area of the fine pore in a direction perpendicular to the depth direction continuously decreases from the outermost surface to the depth direction as in a conical shape and pyramidal shape.

The average interval (period) between adjacent fine pores 22 is preferably equal to or less than the wavelength of the visible light. The average interval between the fine pores 22 is preferably 20 nm or more.

The average interval between the fine pores 22 is obtained by measuring the interval between adjacent fine pores 22 (the distance from the center of a fine pore 22 to the center of an adjacent fine pore 22) at 50 points using electron microscope observation, and then averaging these values.

The average depth of the fine pores 22 is preferably 80 to 500 nm, more preferably 120 to 400 nm, and particularly preferably 150 to 300 nm. The same is also applied to a case where the average interval between the fine pores 22 is about 100 nm.

The average depth of the fine pores 22 is obtained by measuring a distance between the lowermost portion of the fine pore 22 and the uppermost portion of a convex portion between the fine pores 22 at 50 points when observed with an electron microscope at 30000-fold magnification, and then averaging these values.

The aspect ratio of the fine pores 22 (average depth of the fine pores/average interval between adjacent fine pores) is preferably 0.5 to 5.0, more preferably 0.8 to 5.0, further preferably 0.8 to 4.5, particularly preferably 1.2 to 4.0, and most preferably 1.5 to 3.0.

The surface of the mold on the side where a concave-convex microstructure is formed may be treated with a mold release agent.

Examples of the mold release agent include silicone resins, fluorine resins, and fluorine compounds, and fluorine compounds having a hydrolyzable silyl group is particularly preferable.

Effect

The method for producing a mold of the invention described above include the above-described polishing step before the concave-convex microstructure forming step, that is, before the machined roll-shaped aluminum substrate is anodized. Since at least the above-described first affected layer is removed by the polishing step, an oxide film in which fine pores are uniformly dispersed can be formed. Since at least the processed surface of the aluminum substrate is removed by the mechanical polishing in the polishing step, the first affected layer can be more easily removed as compared with the case of using cathode electrolysis, electrolytic polishing, or etching. Therefore, an increase in haze of the transfer article can be suppressed. In addition, when the surface finishing step is included at the same time of the polishing step or between the polishing step and the concave-convex microstructure forming step, the removal trace is less likely to remain, and thus reflection of the removal trace is also less likely to occur in the transfer article. Further, when the anodization time is shortened, a variation in height of each crystal grain boundary can be minimized. According to this, the reflectance of the transfer article can also be lowered and the reflected color can also be brought closer to neutral color.

In this way, according to the method for producing a mold of the invention, it is possible to easily produce a mold for nanoimprinting by which an oxide film in which fine pores are uniformly dispersed can be formed and an article having low haze and excellent antireflection performance or level of appearance can be obtained.

[Method for Manufacturing Article]

A method for manufacturing an article is a method of transferring the concave-convex microstructure formed on the surface of the mold onto the surface of the article main body by using the mold produced by the aforementioned method.

Specifically, an article (transfer article) having a concave-convex microstructure on the surface thereof is obtained by a method (a so-called light-imprinting method) in which an active energy ray-curable resin composition is filled between the mold produced by the method for producing a mold of the invention and the article main body, an active energy ray is irradiated thereto to cure the resin composition, a cured resin layer in which the concave-convex microstructure of the mold is transferred is formed on the surface of the article main body, and the article main body in which the cured resin layer is formed on the surface is separated from the mold.

<Article Main Body>

As the material of the article main body, a material with high transparency is preferable since irradiation of an active energy ray is carried out through the article main body, and for example, polycarbonate, polystyrene-based resins, polyester, acrylic resins, cellulosic resins (triacetylcellulose and the like), polyolefin, glass, or the like is exemplified.

Further, the shape of the article main body may be a film, a sheet, an injection molding, or a press molding.

<Manufacturing Apparatus>

Figure 3:
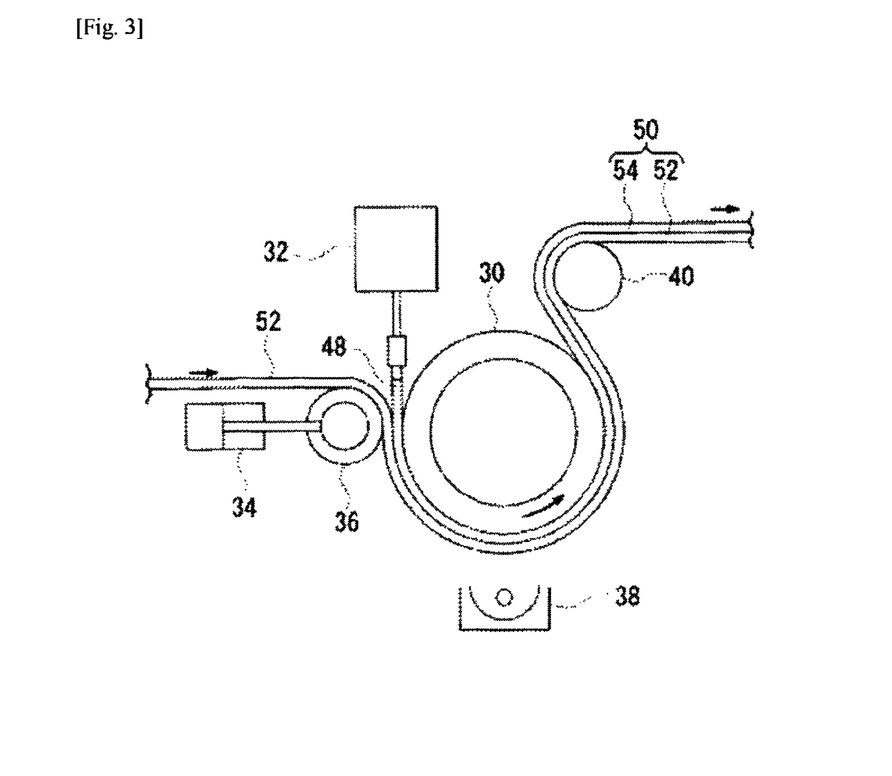
FIG. 3 is a configuration diagram illustrating an example of an apparatus for manufacturing an article which has a concave-convex microstructure on the surface thereof.

The article having a concave-convex microstructure on the surface thereof is manufactured, for example, using the manufacturing apparatus illustrated in FIG. 3, as follows.

An active energy ray-curable resin composition 48 is supplied between a roll-shaped mold 30 having a concave-convex microstructure (not illustrated) on the surface thereof and a band-shaped film (article main body) 52 moving along the surface of the roll-shaped mold 30 from a tank 32.

A film 52 and the active energy ray-curable resin composition 48 are nipped between the roll-shaped mold 30 and a nip roll 36 with a nip pressure adjusted by a pneumatic cylinder 34 and the active energy ray-curable resin composition 48 is filled in the fine pores of the concave-convex microstructure of the roll-shaped mold 30 while being uniformly diffused between the film 52 and the roll-shaped mold 30.

A cured resin layer 54 in which the concave-convex microstructure is transferred on the surface of the roll-shaped mold 30 is formed by irradiating an active energy ray to the active energy ray-curable resin composition 48 through the film 52 from an active energy ray irradiation device 38 disposed below the roll-shaped mold 30 so as to cure the active energy ray-curable resin composition 48.

An article 50 having a concave-convex microstructure on the surface thereof is obtained by separating the film 52 in which the cured resin layer 54 is formed on the surface from the roll-shaped mold 30 by a separating roll 40.

As the active energy ray irradiation device 38, a high-pressure mercury lamp, a metal halide lamp, and the like are exemplified.

The light irradiation energy amount of the active energy ray irradiation is preferably 100 to 10000 mJ/cm$^2$.

<Article>

Figure 4:
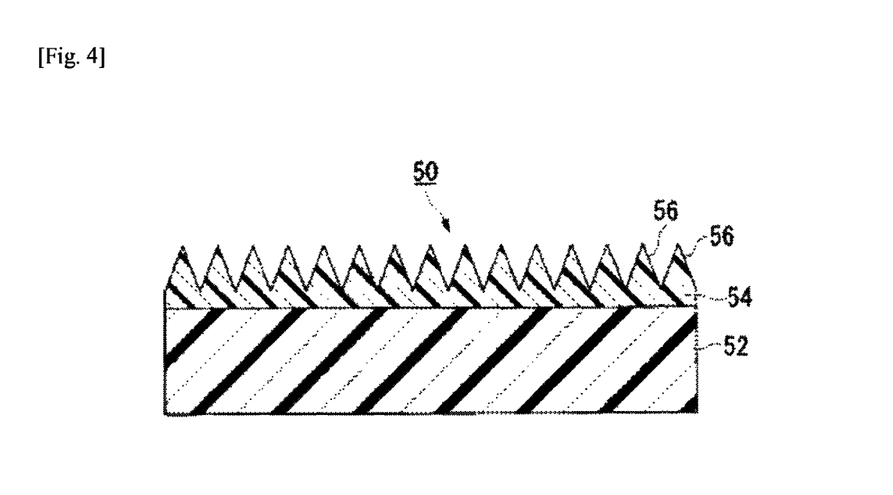
FIG. 4 is a cross-sectional view illustrating an example of an article which has a concave-convex microstructure on the surface thereof.

FIG. 4 is a cross-sectional view illustrating an example of the article 50 having a concave-convex microstructure on the surface thereof.

The cured resin layer 54 is a film made of a cured material of an active energy ray-curable resin composition to be described later and has the concave-convex microstructure on the surface thereof.

The concave-convex microstructure on the surface of the article 50 when a mold produced by the method for producing a mold of the invention is used is formed by transferring the concave-convex microstructure onto a surface of an oxide film of the mold, and has a plurality of convex portions 56 made of a cured material of an active energy ray-curable resin composition.

It is preferable that the concave-convex microstructure have a so-called moth-eye structure in which a plurality of protrusions (convex portions) of a substantially conical shape, a pyramidal shape, or the like are aligned. The moth-eye structure having an interval between protrusions equal to or less than the wavelength of visible light is known to be an effective antireflection means since the refractive index continuously increases from the refractive index of air to the refractive index of the material.

The average interval (period) between the convex portions (protrusions) is preferably equal to or less than the wavelength of the visible light, that is, equal to or less than 400 nm, more preferably equal to or less than 200 nm, and particularly preferably equal to or less than 150 nm when the article 50 is used for visible light antireflection. Further, when the article 50 is used for blue light antireflection, the average interval is preferably equal to or less than the wavelength of the blue light, that is, equal to or less than 460 nm, more preferably equal to or less than 200 nm, and particularly preferably equal to or less than 150 nm.

Further, the average interval between the convex portions is preferably equal to or more than 20 nm from a viewpoint of easy forming of the convex portions.

The average interval between the convex portions is obtained by measuring the interval between adjacent convex portions (the distance from the center of a convex portion to the center of a convex portion) at 50 points with electron microscope observation, and then averaging these values.

The height of the convex portions is preferably 80 to 500 nm, more preferably 120 to 400 nm, and particularly preferably 150 to 300 nm, when the average interval is 100 nm. When the height of the convex portions is equal to or more than 80 nm, reflectance is sufficiently low and the wavelength dependency of the reflectance is low. When the height of the convex portions is equal to or less than 500 nm, the scratch resistance of the convex portions is favorable.

The height of the convex portions is a value obtained by measuring a distance between the uppermost portion of the convex portion and the lowermost portion of a concave portion between the convex portions when observed with an electron microscope at 30000-fold magnification.

The aspect ratios of the convex portions (height of the convex portions/average interval between the convex portions) are preferably 0.5 to 5.0, more preferably 0.8 to 5.0, further preferably 0.8 to 4.5, particularly preferably 1.2 to 4.0, and most preferably 1.5 to 3.0. When the aspect ratios of convex portions are equal to or more than 0.5, the cured resin layer can be sufficiently used as a super hydrophilic film or a super water-repellent film. When the aspect ratios of convex portions are equal to or less than 5.0, the scratch resistance of the convex portions is favorable.

The shapes of the convex portions are preferably shapes in which the cross-sectional areas of the convex portions in a direction perpendicular to the height direction continuously increase from the outermost surface to the depth direction, that is, the cross-sectional shapes of the convex portions in the height direction preferably have a triangular shape, a trapezoidal shape, a bell shape, or the like.

When the article 50 is used for antireflection application, it is preferable that the wavelength dispersion of reflected light or transmitted light be small. When there is wavelength dispersibility in reflected light or transmitted light, reflected light or the like may be colored to be recognized in some cases. When the wavelength dispersion is small, coloring of reflected light is difficult to recognize, and thus a product using the article 50 for antireflection is less likely to be influenced by individual taste. In order to suppress coloring of reflected light or the like, as described above, at least the first affected layer is removed and the anodization time is shortened so that the wavelength dispersion of reflected light or transmitted light of the article 50 can be decreased.

The wavelength dispersion or coloring of reflected light or transmitted light can be defined in such a manner that a spectrum of reflected light or transmitted light is measured using a spectrophotometer or the like in accordance with JIS Z 8729 or ISO-11664-4 and a value of the L*a*b* color system (Lab color space) is obtained from the measurement thus obtained. The L*a*b* color system corresponds to brightness of color (L*=0 indicates black, L*=100 indicates diffuse white, and the reflected color of white is higher), a position between red/magenta and green (a*, a negative value is close to green and a positive value is close to magenta), and a position between yellow and blue (b*, a negative value is close to blue and a positive value is close to yellow). That is, as the distance from the origin of L*a*b* (L*=0, a*=0, b*=0), that is, the color difference (E*) decreases, coloring is decreased.

When the article 50 is used for antireflection application, it is preferable that in a wavelength region of visible light, the color difference (E*) with the origin represented by the L*a*b* color system, which is obtained by the following formula (1), be 0.9 or less. when the color difference (E*) is 0.9 or less, coloring of reflected light or transmitted light from the article 50 can be sufficiently suppressed.

$$E^* = \{(L^*)^2 + (a^*)^2 + (b^*)^2\}^{1/2} \quad (1)$$

Further, when the article 50 is used for antireflection application, it is preferable that in the wavelength region of visible light, the chroma (C*) obtained by the following formula (2) from values of a* and b* which are measured by the L*a*b* color system is 0.7 or less. When the chroma (C*) is 0.7 or less, coloring of reflected light or transmitted light from the article 50 can be sufficiently suppressed. Incidentally, the chroma (C*) is a value of color in which a brightness factor is excluded and is defined by the distance of a* and b* from the origin.

$$C^* = \{(a^*)^2 + (b^*)^2\}^{1/2} \quad (2)$$

Further, when the article 50 is used for antireflection application, it is preferable that in the wavelength region of visible light, a difference (Δλ) between the maximum value and the minimum value of reflectance with respect to incident light for each wavelength be 0.2% or less. According to this, the reflected color from the article 50 can be brought closer to neutral color.

However, when a surface has a moth-eye structure, it is known that when the surface is made of a hydrophobic material, super water repellency is acquired due to a lotus effect, and when the surface is made of a hydrophilic material, super hydrophilicity is acquired.

The water contact angle of the surface of the concave-convex microstructure when the cured resin layer 54 of the article 50 is made of a hydrophobic material is preferably equal to or more than 90°, more preferably equal to or more than 110°, and particularly preferably equal to or more than 120°. When the water contact angle is equal to or more than 90°, since water contaminants do not easily adhere to the surface, sufficient antifouling properties are exhibited. Further, since water is not easily adhered, anti-icing can be expected.

The water contact angle of the surface of the concave-convex microstructure when the cured resin layer 54 is made of a hydrophilic material is preferably equal to or less than 25°, more preferably equal to or less than 23°, and particularly preferably equal to or less than 21°. When the water contact angle is equal to or less than 25°, contaminants adhering to the surface can be washed away with water and oil contaminants do not easily adhere, and thereby sufficient antifouling properties are exhibited. It is preferable that the water contact angle be equal to or more than 3° from a viewpoint of suppressing deformation of the concave-convex microstructure due to absorption of the cured resin layer 54 and a reflectance increase due to the deformation.

<Active Energy Ray-Curable Resin Composition>

The active energy ray-curable resin composition includes a polymerizable compound and a polymerization initiator.

Examples of polymerizable compounds include monomers, oligomers, and reactive polymers having radical polymerizable bonds and/or cationic polymerizable bonds in a molecule.

Examples of monomers having radical polymerizable bonds include monofunctional monomers and multifunctional monomers.

Examples of the monofunctional monomers include (meth)acrylate derivatives such as methyl (meth)acrylate, ethyl (meth)acrylate, propyl (meth)acrylate, n-butyl (meth)acrylate, butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth) acrylate, hydroxypropyl (meth)acrylate, 2-methoxyethyl (meth)acrylate, and 2-ethoxyethyl (meth)acrylate; (meth) acrylic acid and (meth)acrylonitrile; styrene derivatives such as styrene and α-methyl styrene; and (meth)acrylamide derivatives such as (meth)acrylamide, N-dimethyl (meth) acrylamide, N-diethyl (meth)acrylamide, and dimethylaminopropyl (meth)acrylamide.

These may be used alone or in combination of two or more kinds thereof.

Examples of multifunctional monomers include bifunctional monomers such as ethylene glycol di(meth)acrylate, tripropylene glycol di(meth)acrylate, isocyanuric acid ethylene oxide denatured di(meth)acrylate, triethylene glycol di(meth)acrylate, diethylene glycol di(meth)acrylate, neopentyl glycol di(meth)acrylate, 1,6-hexanediol di(meth) acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxy propoxy)phenyl)propane, 1,2-bis (3-(meth)acryloxy-2-hydroxy propoxy)ethane, 1,4-bis(3-(meth)acryloxy-2-hydroxy propoxy)butane, dimethylol tricyclo decane di(meth)acrylate, di(meth)acrylate of an ethylene oxide adduct of bisphenol A, di(meth)acrylate of propylene oxide adduct of bisphenol A, hydroxypivalic acid neopentylglycol di(meth)acrylate, divinylbenzene, and methylenebisacrylamide; trifunctional monomers such as pentaerythritol tri(meth)acrylate, trimethylol propane tri (meth)acrylate, trimethylol propane ethylene oxide denatured tri(meth)acrylate, trimethylol propane propylene oxide denatured triacrylate, trimethylol propane ethylene oxide denatured triacrylate, and isocyanuric acid ethylene oxide denatured tri(meth)acrylate; tetrafunctional or higher monomers such as a condensation reaction mixture of succinic acid/trimethylolethane/acrylic acid, dipentaerythritol hexa (meth)acrylate, dipentaerythritol penta(meth)acrylate, ditrimethylol propane tetra acrylate, and tetramethylol methane tetra(meth)acrylate; bifunctional or higher urethane acrylates, and bifunctional or higher polyester acrylates.

These may be used alone or in combination of two or more kinds thereof.

Examples of monomers having cationic polymerizable bonds include monomers having an epoxy group, an oxetanyl group, an oxazolyl group, a vinyloxy group, or the like, and monomers having an epoxy group are particularly preferable.

Examples of oligomers or reactive polymers include unsaturated polyesters such as a condensate of unsaturated dicarboxylic acid and polyalcohol; polyester (meth)acrylate, polyether (meth)acrylate, polyol (meth)acrylate, epoxy (meth)acrylate, urethane (meth)acrylate, cationic polymerization type epoxy compounds, and monomers which have radical polymerizable bonds in the side chain or copolymerization polymers of the aforementioned monomer.

When a photo-curing reaction is used, examples of photopolymerization initiators include carbonyl compounds such as benzoin, benzoinmethylether, benzoinethylether, benzoinisopropylether, benzoinisobutylether, benzyl, benzophenone, p-methoxybenzophenone, 2,2-diethoxyacetophenone, α,α-dimethoxy-α-phenylacetophenone, methylphenylglyoxylate, ethylpenylglyoxylate, 4,4'-bis (dimethylamino)benzophenone, and 2-hydroxy-2-methyl-1-phenylpropan-1-one; sulfur compounds such as tetramethylthiurammonosulfide and tetramethylthiuramdisulfide; 2,4,6-trimethylbenzoyldiphenylphosphineoxide, and benzoyl diethoxyphosphine oxide.

These may be used alone or in combination of two or more kinds thereof.

When an electron irradiation curing reaction is used, examples of polymerization initiators include thioxanthones such as benzophenone, 4,4-bis(diethylamino)benzophenone, 2,4,6-trimethylbenzophenone, methylorthobenzoylbenzoate, 4-phenylbenzophenone, t-butylanthraquinone, 2-ethyl anthraquinone, 2,4-diethyl thioxanthone, isopropylthioxanthone, and 2,4-dichlorothioxanthone; acetophenones such as diethoxyacetophenone, 2-hydroxy-2-methyl-1-phenylpropan-1-one, benzyldimethylketal, 1-hydroxycyclohexyl-phenyl ketone, 2-methyl-2-morpholino(4-thio methylphenyl) propan-1-one, and 2-benzyl-2-dimethylamino-1-(4-morpholinophenyl)-butanone; benzoin ethers such as benzoinmethylether, benzoinethylether, benzoinisopropylether, and benzoinisobutylether; acyl phosphine oxides such as 2,4,6-trimethylbenzoyldiphenylphosphineoxide, bis(2,6-dimethoxybenzoyl)-2,4,4-trimethylpentylphosphineoxide, and bis(2,4,6-trimethylbenzoyl)-phenyl phosphine oxide; methylbenzoylformate, 1,7-bisacridinylheptan, and 9-phenyl acridine.

These may be used alone or in combination of two or more kinds thereof.

When a thermosetting reaction is used, examples of thermal polymerization initiators include organic peroxides such as methylethylketoneperoxide, benzoylperoxide, dicumyl peroxide, t-butyl hydroperoxide, cumenehydroperoxide, t-butyl peroxyoctoate, t-butyl peroxybenzoate, and lauroylperoxide; azo-based compounds such as azobisisobutyronitrile; and redox polymerization initiators in which an amine such as N,N-dimethylaniline or N,N-dimethyl-p-toluidine is combined with the aforementioned organic peroxides.

The amount of the polymerization initiator is preferably 0.1 to 10 parts by mass with respect to 100 parts by mass of the polymerizable compound. When the amount of the polymerization initiator is less than 0.1 part by mass, it is difficult to carry out polymerization. When the amount of the polymerization initiator is more than 10 parts by mass, a curable film may be colored or mechanical strength may be lowered.

The active energy ray-curable resin composition may optionally include a non-reactive polymer, an active energy ray sol-gel reactive composition, an antistatic agent, an additive such as a fluorine compound for improving anti-fouling properties, fine particles, and a small amount of solvent.

Examples of non-reactive polymers include acrylic resins, styrene-based resins, polyurethane, cellulosic resins, polyvinyl butyral, polyester, and thermoplastic elastomers.

Examples of active energy ray sol-gel reactive compositions include alkoxysilane compounds and alkyl silicate compounds.

Examples of alkoxysilane compounds include tetramethoxysilane, tetra-i-propoxysilane, tetra-n-propoxy silane, tetra-n-butoxysilane, tetra-sec-butoxy silane, tetra-t-butoxy silane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxy silane.

Examples of alkyl silicate compounds include methylsilicate, ethylsilicate, isopropylsilicate, n-propylsilicate, n-butylsilicate, n-pentylsilicate, and acetylsilicate.

(Hydrophobic Material)

In order to make the water contact angle of the surface of the concave-convex microstructure of the cured resin layer equal to or more than 90°, a composition including a fluorine-containing compound or a silicone-based compound is preferably used as the active energy ray-curable resin composition capable of forming a hydrophobic material.

Fluorine-Containing Compounds:

Examples of the fluorine-containing compounds include fluorine-containing monomers, fluorine-containing silane-coupling agents, fluorine-containing surfactants, and fluorine-containing polymers.

Examples of the fluorine-containing monomers include fluoroalkyl group-substituted vinyl monomers and fluoroalkyl group-substituted ring-opening polymerizable monomers.

Examples of the fluoroalkyl group-substituted vinyl monomers include fluoroalkyl group-substituted (meth) acrylates, fluoroalkyl group-substituted (meth)acrylamides, fluoroalkyl group-substituted vinyl ethers, and fluoroalkyl group-substituted styrenes.

Examples of the fluoroalkyl group-substituted ring-opening polymerizable monomers include fluoroalkyl group-substituted epoxy compounds, fluoroalkyl group-substituted oxetane compounds, and fluoroalkyl group-substituted oxazoline compounds.

Examples of the fluorine-containing silane-coupling agents include 3,3,3-trifluoropropyltrimethoxysilane, 3,3,3-trifluoropropyltriacetoxy silane, dimethyl-3,3,3-trifluoropropylmethoxysilane, and tridecafluoro-1,1,2,2-tetrahydrooctyltriethoxy silane.

Examples of the fluorine-containing surfactants include fluoroalkyl group-containing anionic surfactants and fluoroalkyl group-containing cationic surfactants.

Examples of the fluorine-containing polymers include polymers of fluoroalkyl group-containing monomers, copolymers of fluoroalkyl group-containing monomers and poly(oxyalkylene) group-containing monomers, and copolymers of fluoroalkyl group-containing monomers and cross-linking reaction group-containing monomers. The fluorine-containing polymers may be copolymers with another copolymerizable monomers.

Silicone-Based Compounds:

Examples of the silicone-based compounds include (meth)acrylic denatured silicones, silicone resins, and silicone-based silane coupling agents.

Examples of the (meth)acrylic denatured silicones include silicone(di)(meth)acrylate, and for example, silicone diacrylate "x-22-164" or "x-22-1602" manufactured by Shin-Etsu Chemical Co., Ltd is preferably used.

(Hydrophilic Material)

In order to make the water contact angle of the surface of the concave-convex microstructure of the cured resin layer equal to or less than 25°, a composition containing at least a hydrophilic monomer is preferably used as the active energy ray-curable resin composition capable of forming a hydrophilic material. In addition, from the viewpoint of providing the scratch resistance and the water resistance, the composition more preferably contains a cross-linking multifunctional monomer. Incidentally, the hydrophilic monomer and the cross-linking multifunctional monomer may be the same (that is, a hydrophilic multifunctional monomer). Furthermore, the active energy ray-curable resin composition may also contain other monomers.

A composition containing tetrafunctional or higher multifunctional (meth)acrylate, bifunctional or higher hydrophilic (meth)acrylate, and optionally a monofunctional monomer is more preferably used as the active energy ray-curable resin composition capable of forming a hydrophilic material.

Examples of tetrafunctional or higher multifunctional (meth)acrylates include ditrimethylolpropane tetra(meth)acrylate, pentaerythritol tetra(meth)acrylate, pentaerythritolethoxy tetra(meth)acrylate, dipentaerythritolhydroxy penta (meth)acrylate, dipentaerythritol hexa(meth)acrylate, a condensation reaction mixture with a molar ratio 1:2:4 of succinic acid/trimethylolethane/acrylic acid, urethane acrylates (manufactured by DAICEL-ALLNEX LTD.: EBECRYL 220, EBECRYL 1290, EBECRYL 1290K, EBECRYL 5129, EBECRYL 8210, EBECRYL 8301, KRM 8200), polyether acrylates (manufactured by DAICEL-ALLNEX LTD.: EBECRYL 81), denatured epoxy acrylates (manufactured by DAICEL-ALLNEX LTD.: EBECRYL 3416), and polyester acrylates (manufactured by DAICEL-ALLNEX LTD.: EBECRYL 450, EBECRYL 657, EBECRYL 800, EBECRYL 810, EBECRYL 811, EBECRYL 812, EBECRYL 1830, EBECRYL 845, EBECRYL 846, EBECRYL 1870). These may be used alone or in combination of two or more kinds thereof.

The tetrafunctional or higher multifunctional (meth)acrylate is more preferably a pentafunctional or higher multifunctional (meth)acrylate.

The ratio of the tetrafunctional or higher multifunctional (meth)acrylate is preferably 10 to 90% by mass, more preferably 20 to 90% by mass, and particularly preferably 30 to 90% by mass in 100% by mass in total of the whole monomers constituting the active energy ray-curable resin composition. When the ratio of the tetrafunctional or higher multifunctional (meth)acrylate is 10% by mass or more, the elastic modulus is high and the scratch resistance is improved. When the ratio of the tetrafunctional or higher multifunctional (meth)acrylate is 90% by mass or less, it is difficult to form small cracks on the surface and for appearance defects to occur.

Examples of bifunctional or higher hydrophilic (meth) acrylate include multifunctional acrylates and polyethylene glycol dimethacrylates having long chain polyethylene glycol such as Aronix M-240 and Aronix M260 (manufactured by Toagosei Co., Ltd.) and NK Ester AT-20E and NK Ester ATM-35E (manufactured by Shin-Nakamura Chemical Co., Ltd.). These may be used alone or in combination of two or more kinds thereof.

In polyethylene glycol dimethacrylate, the total of average repeating units in polyethylene glycol chains present in a molecule is preferably 6 to 40, more preferably 9 to 30, and particularly preferably 12 to 20. When the average repeating units in the polyethylene glycol chains is 6 or more, hydrophilicity is sufficient and antifouling properties are improved. When the average repeating units in the polyethylene glycol chains is 40 or less, the compatibility with tetrafunctional or higher multifunctional (meth)acrylate becomes favorable and the active energy ray-curable resin composition is difficult to separate.

The ratio of bifunctional or higher hydrophilic (meth) acrylate is preferably 3 to 90% by mass and more preferably 3 to 70% by mass in 100% by mass in total of the whole monomers constituting the active energy ray-curable resin composition. When the ratio of the bifunctional or higher hydrophilic (meth)acrylate is 3% by mass or more, hydrophilicity is sufficient and the antifouling properties are improved. When the ratio of the bifunctional or higher hydrophilic (meth)acrylate is 90% by mass or less, elastic modulus is increased and the scratch resistance is improved.

A hydrophilic monofunctional monomer is preferable for the monofunctional monomer.

Examples of the hydrophilic monofunctional monomer include monofunctional (meth)acrylates having a polyethylene glycol chain on an ester group such as M-20G, M-90G, and M-230G (manufactured by Shin-Nakamura Chemical Co., Ltd.), monofunctional (meth)acrylates having a hydroxyl group on an ester group such as hydroxyalkyl (meth)acrylates, and cationic monomers such as monofunctional acrylamides, methacrylamidopropyltrimethylammonium methyl sulfate, and methacryloyloxyethyltrimethylammonium methyl sulfate.

Further, viscosity adjusters such as acryloylmorpholine and vinylpyrrolidone, and adhesion improvers such as acryloylisocyanate which improve adhesion to an article main body, and the like may also be used as monofunctional monomers.

The ratio of the monofunctional monomer is preferably 0 to 20% by mass and more preferably 5 to 15% by mass in 100% by mass in total of the whole monomers constituting the active energy ray-curable resin composition. Adhesion between the substrate and the curable resin is improved by using the monofunctional monomer. when the ratio of the monofunctional monomer is 20% by mass or less, the antifouling properties or the abrasion resistance is sufficiently exhibited without a shortage of tetrafunctional or higher multifunctional (meth)acrylate or bifunctional or higher hydrophilic(meth) acrylate.

The monofunctional monomer may be mixed by 0 to 35% by mass to an active energy ray-curable resin composition as a polymer having a low degree of polymerization (co) polymerized with one, or two or more kinds. Examples of the polymers having a low degree of polymerization include 40/60 copolymer oligomers (MG polymer manufactured by MRC UNITEC Co. Ltd.) of monofunctional (meth)acrylates having a polyethylene glycol chain in an ester group such as M-230G (manufactured by Shin-Nakamura Chemical Co., Ltd.) and methacrylamidopropyltrimethylammonium methyl sulfate.

Effect

According to the method for manufacturing an article described above, the mold produced by the method for producing a mold of the invention described above is used. In particular, when an article used for antireflection is manufactured, an article which is less colored can be obtained by using a mold in which the anodization time is shortened.

The article obtained by the invention exhibits various performances such as antireflection performance and water-repellent performance by the concave-convex microstructure on the surface. As an application of the article, there are examples of an anti-reflective article, an anti-fogging article, an anti-fouling article, and a water-repellent article, more specifically, antireflection for a display device, a meter cover of a vehicle, a mirror of a vehicle, a window of a vehicle, a light extraction efficiency improving member of an organic or inorganic electroluminescence, a solar cell member and the like.

EXAMPLES

Hereinafter, the invention will be described in detail by means of Examples, but the invention is not limited thereto.
"Measurement and Evaluation"
<Measurement of Average Crystal Grain Size>
The diameter of a hypothetical circle was measured on the crystal grain on the surface of the aluminum substrate by using an image analysis software ("Image-Pro PLUS" produced by Nippon Roper K.K.). The measurement was performed for 100 grains and an average value thereof was considered as an average crystal grain size.
<Measurement of Arithmetic Mean Roughness (Ra) and Maximum Height Roughness (Rz)>
The arithmetic mean roughness (Ra) and the maximum height roughness (Rz) of the processed surface of the aluminum substrate were measured by using a scanning probe microscope (manufactured by Hitachi High-Technologies Corporation, "SPI4000 Probe Station, SPA400 (unit)") in accordance with JIS B 0601:1994 under the following measurement conditions. Incidentally, as data processing, flat processing was performed after primary skew correction processing.
Measurement Conditions:
  Scanning mode: DFM mode
  Probe: Si cantilever "DF-20" (manufactured by Hitachi High-Technologies Corporation)

Scanning speed: 0.4 Hz, Rotation 90 degrees (scanning in a direction perpendicular to the rolling trace direction)
Scanning range: 2.5 μm×2.5 μm
Pixel number: 512×512

<Measurement of Fine Pores of Anodized Alumina>

A part of the anodized alumina was cut, platinum was vapor-deposited on the longitudinal cross-section thereof for 1 minute, and the cross-section was observed using a field emission-type scanning electron microscope (manufactured by JEOL Ltd., "JSM-7400F") under conditions of an accelerating voltage of 3.00 kV, whereby the intervals between adjacent fine pores and the depth of the fine pores were measured. Each of the measurements was performed for 50 points, and the average value thereof was considered as a measured value.

<Measurement of Concavity and Convexity of Article>

Platinum was deposited on the vapor-deposited on the longitudinal cross-section of the article having a concave-convex microstructure on the surface thereof for 10 minutes, and the intervals between adjacent convex portions and the height of the convex portions were measured by using the same apparatus and conditions as in the measurement of the fine pores of the anodized alumina. Each of the measurements was performed for 50 points, and the average value thereof was considered as a measured value.

<Measurement of Haze of Article>

The haze of the article having a concave-convex microstructure on the surface thereof was measured by using a haze meter (manufactured by Suga Test Instruments Co., Ltd.) in accordance with JIS K 7361-1:1997.

<Calculation of Color Difference (E*) of Article>

First, the reflectance in the wavelength region of visible light of the article having a concave-convex microstructure on the surface thereof was measured by using a spectrophotometer UV-2450 (manufactured by Shimadzu Corporation).

Based on the measurement result of the reflectance, a color difference (E*) with the origin represented by an L*a*b* color system was calculated by the above-described formula (1) in accordance with JIS Z 8729 (ISO-11664-4), and the evaluation was performed on the basis of the following evaluation criteria.

α: $E^* \leq 0.9$
β: $0.9 < E^* \leq 1.2$
γ: $1.2 < E^*$

<Calculation of Chroma (C*) of Article>

First, the reflectance in the wavelength region of visible light of the article having a concave-convex microstructure on the surface thereof was measured by using a spectrophotometer UV-2450 (manufactured by Shimadzu Corporation).

Based on the measurement result of the reflectance, values of a* and b* were obtained in accordance with JIS Z 8729 (ISO-11664-4) and a chroma (C*) was calculated by the above-described formula (2). The evaluation was performed on the basis of the following evaluation criteria.

α: $C^* \leq 0.7$
β: $0.7 < C^* \leq 1.1$
γ: $1.1 < C^*$

<Calculation of Difference (Δλ) Between Maximum Value and Minimum Value of Reflectance of Article>

First, the reflectance in the wavelength region of visible light of the article having a concave-convex microstructure on the surface thereof was measured by using a spectrophotometer UV-2450 (manufactured by Shimadzu Corporation).

Based on the measurement result of the reflectance, the reflectance of each wavelength was read, and a difference (Δλ) between a maximum value and a minimum value of reflectance with respect to incident light for each wavelength was calculated. The evaluation was performed on the basis of the following evaluation criteria.

α: $\Delta\lambda \leq 0.2$
β: $0.2 < \Delta\lambda \leq 0.5$
γ: $0.5 < \Delta\lambda$ Example 1

Production of Mold

A hollow roll-shaped aluminum substrate (length in the longitudinal direction: 300 mm) with a purity of 99.99% was subjected to mirror surface cutting.

The average crystal grain size, the arithmetic mean roughness (Ra), and the maximum height roughness (Rz) of the processed surface of the aluminum substrate were measured. The results thereof are presented in Table 1.

The polishing step and the surface finishing step were performed by using the polishing apparatus 10 illustrated in FIG. 1, as follows.

Incidentally, in the polishing step, a polyester non-woven fabric was used as the coated abrasive 14b, and a dispersion liquid obtained by dispersing oxidized aluminum having an average particle diameter of 1 μm in water was used as a slurry. The pH of the dispersion liquid at 25° C. was 2.

In the surface finishing step, a foamed polyurethane suede was used as the coated abrasive 14b, and a dispersion liquid obtained by dispersing $SiO_2$ particles having an average particle diameter of 0.1 μm in water was used as a slurry. The pH of the dispersion liquid at 25° C. was 10.

(Polishing Step)

First, a rotary driving portion (not illustrated) was driven in a state where the shaft 12 was penetrated through the aluminum substrate 20 so as to rotate a support shaft (not illustrated), thereby rotating the aluminum substrate 20.

Separately, the rotary driving portion (not illustrated) was driven in a state where the belt-shaped coated abrasive 14b was attached to the polishing roll 14a so that the polishing roll 14a is rotated in the same direction as the rotation direction of the aluminum substrate 20.

While the aluminum substrate 20 and the polishing roll 14a were rotated, the coated abrasive 14b was brought into press contact with the outer peripheral surface 20a of the aluminum substrate 20. Then, a slurry was supplied from the slurry supplying means 16 between the coated abrasive 14b and the outer peripheral surface 20a of the aluminum substrate 20. The region A to be polished was moved to the longitudinal direction of the aluminum substrate 20 by moving the polishing means 14 and the slurry supplying means 16 along the longitudinal direction of the aluminum substrate 20 so that the whole outer peripheral surface 20a of the aluminum substrate 20 was coarsely polished to have a polishing thickness of 10 μm. The washing means 18 was also moved in synchronization with the movement of the polishing means 14 and the slurry supplying means 16, and a washing liquid was supplied from the washing means 18 to the region which had been polished (polished region) B so that the slurry attached to the outer peripheral surface 20a of the aluminum substrate 20 was removed.

The average crystal grain size of the processed surface of the aluminum substrate after the polishing step was measured. The result thereof is presented in Table 1.

(Surface Finishing Step)

The coated abrasive 14b and the slurry were changed, and subsequently, the whole outer peripheral surface 20a of the aluminum substrate 20 after the polishing step was subjected to final polishing to be mirror-polished so that an arithmetic mean roughness became 15 nm or less.

(Step of Forming Concave-Convex Microstructure)
Step (a):
The aluminum substrate after the surface finishing step was anodized for 30 minutes in a 0.3 M oxalic acid aqueous solution under conditions of a direct current of 40 V and a temperature of 16° C.
Step (b):
The aluminum substrate having an oxide film formed thereon was immersed in a mixed aqueous solution of 6% by mass of phosphoric acid/1.8% by mass of chromic acid for 6 hours, thereby removing the oxide film.
Step (c):
The aluminum substrate was re-anodized for 30 seconds in a 0.3 M oxalic acid aqueous solution under conditions of a direct current of 40 V and a temperature of 16° C.
Step (d):
The aluminum substrate having an oxide film formed thereon was immersed in 5% by mass of phosphoric acid (32° C.) for 8 minutes, thereby performing a fine pore diameter-increasing process.
Step (e):
The aluminum substrate was anodized for 30 seconds in a 0.3 M oxalic acid aqueous solution under conditions of a direct current of 40 V and a temperature of 16° C.
Step (f):
The step (d) and the step (e) were repeated four times in total and the step (d) was finally performed, thereby obtaining a mold in which anodized alumina having fine pores of a substantially conical shape at an average interval of 100 nm and an average depth of 180 nm was formed on the surface.

<Manufacturing of Article Having Concave-Convex Microstructure on Surface Thereof>

Between the obtained mold and an acrylic film as a transparent substrate (produced by Mitsubishi Rayon Co., Ltd., "ACRYLPLEN HBS010"), an active energy ray-curable resin composition with the following composition was filled therein, and ultraviolet ray with an integrated light amount of 1000 mJ/cm$^2$ was irradiated by using a high-pressure mercury lamp to cure the active energy ray-curable resin composition. Thereafter, the mold was released from the film to thereby obtain an article having a concave-convex microstructure (average interval of convex portions: 100 nm, average height: 180 nm) on the surface thereof.

The haze and the reflectance of the article having a concave-convex microstructure on the surface thereof were measured, the color difference (E*), the chroma (C*), the difference (Δλ) between the maximum value and the minimum value of reflectance were calculated, and then the evaluation was performed thereon. The results thereof are presented in Table 1.

(Active Energy Ray-Curable Resin Composition)

60 parts by mass of a condensation reaction mixture of succinic acid/trimethylolethane/acrylic acid (molar ratio: 1:2:4), 30 parts by mass of polyethylene glycol diacrylate (manufactured by Shin-Nakamura Chemical Co., Ltd., "A-600"), 10 parts by mass of methyl acrylate (manufactured by Mitsubishi Chemical Corporation), 1.0 part by mass of an alkylphenone-based photopolymerization initiator (manufactured by Ciba Specialty Chemicals K. K., "Irg184"), 0.1 part by mass of an acyl phosphine oxide-based photopolymerization initiator (manufactured by Ciba Specialty Chemicals K. K., "Irg819"), 0.3 part by mass of a phosphoric acid ester-based mold release agent (manufactured by Axel Plastics Research Laboratories, Inc. "INT-1856").

Example 2

A hollow roll-shaped aluminum substrate (length in the longitudinal direction: 300 mm) with a purity of 99.99% was coarsely cut. The average crystal grain size, the arithmetic mean roughness (Ra), and the maximum height roughness (Rz) of the processed surface of the aluminum substrate were measured. The results thereof are presented in Table 1.

A mold was produced in the same manner as in Example 1, except that this aluminum substrate was used and the polishing thickness in the polishing step was changed to 8 μm. The average crystal grain size of the processed surface of the aluminum substrate after the polishing step was measured. The result thereof is presented in Table 1.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

Example 3

A mold was produced in the same manner as in Example 1, except that the polishing thickness in the polishing step was changed to 4 μm. The average crystal grain size of the processed surface of the aluminum substrate after the polishing step was measured. The result thereof is presented in Table 1.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

Example 4

A mold was produced in the same manner as in Example 1, except that the anodization time of the step (a) in the concave-convex microstructure forming step was changed to 3 minutes. The average crystal grain size of the processed surface of the aluminum substrate after the polishing step was measured. The result thereof is presented in Table 1.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

Example 5

A mold was produced in the same manner as in Example 1, except that the step (a) and the step (b) in the concave-convex microstructure forming step were not performed. The average crystal grain size of the processed surface of the aluminum substrate after the polishing step was measured. The result thereof is presented in Table 1.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

Comparative Example 1

A mold was produced in the same manner as in Example 1, except that the polishing step was not performed.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

Comparative Example 2

A mold was produced in the same manner as in Example 1, except that polishing step and the step (a) and the step (b) in the concave-convex microstructure forming step were not performed.

An article having a concave-convex microstructure on the surface thereof was manufactured in the same manner as in Example 1, except that the obtained mold was used. The haze and the reflectance of the article were measured, the color difference (E*), the chroma (C*), the difference (Δλ) between the maximum value and the minimum value of reflectance were calculated, and then the evaluation was performed thereon. The results thereof are presented in Table 1.

In the case of Examples 1, 4, and 5, the average crystal grain size of the surface of the aluminum substrate after the polishing step was 30 μm or more, and the whole of the first affected layer and the second affected layer was removed.

In the case of Example 2, the average crystal grain size of the surface of the aluminum substrate after the polishing step was 1 μm or more but less than 30 μm, and the whole first affected layer and a part of the second affected layer were removed.

In the case of Example 3, the average crystal grain size of the surface of the aluminum substrate after the polishing step was 1 μm or more but less than 30 μm, and the whole first affected layer and a part of the second affected layer were removed.

Further, the article having a concave-convex microstructure on the surface thereof, which was manufactured by using the mold obtained in each Example, had low haze and excellent transparency. The reason why the haze of the article was low is considered that an oxide film having fine pores uniformly dispersed was formed in the production of the mold. Of them, in Examples 4 and 5, since the anodization time in the concave-convex microstructure forming step was set to be short, a level difference in crystal grain boundary was decreased, the reflectance and the color difference of the article was low, and the antireflection performance was particularly excellent.

On the other hand, the article having a concave-convex microstructure on the surface thereof, which was manufactured by using the mold obtained in Comparative Example 1 in which the polishing step was not performed, had high haze and was inferior in transparency. The reason why the haze of the article was high is considered that an oxide film having fine pores non-uniformly dispersed was formed in the production of the mold.

The article having a concave-convex microstructure on the surface thereof, which was manufactured by using the mold obtained in Comparative Example 2 in which the step (a) and the step (b) were not performed in concave-convex microstructure forming step, had high haze and large color difference and was inferior in transparency and antireflection performance.

INDUSTRIAL APPLICABILITY

The mold obtained by the method for producing a mold of the invention is useful for efficient mass production of an anti-reflective article, an anti-fogging article, an anti-fouling article, and a water-repellent article.

TABLE 1

| | | Surface Roughness of aluminum substrate before polishing step | | Polishing thickness | Average crystal grain size [μm] | | Step (a) condition | Haze | | | |
|---|---|---|---|---|---|---|---|---|---|---|---|
| | Cutting condition | Ra [μm] | Rz [μm] | [μm] | Before polishing step | After polishing step | [min] | [%] | E* | C* | Δλ |
| Example 1 | Mirror surface cutting | 0.012 | 0.087 | 10 | Less than 1 μm | 30 μm or more | 30 | 0.3 | β | β | β |
| Example 2 | Coarse cutting | 0.381 | 2.556 | 8 | Less than 1 μm | 1 μm or more but less than 30 μm | 30 | 0.33 | β | β | β |
| Example 3 | Mirror surface cutting | 0.012 | 0.087 | 4 | Less than 1 μm | 1 μm or more but less than 30 μm | 30 | 0.5 | β | β | β |
| Example 4 | Mirror surface cutting | 0.012 | 0.087 | 10 | Less than 1 μm | 30 μm or more | 3 | 0.64 | β | β | α |
| Example 5 | Mirror surface cutting | 0.012 | 0.087 | 10 | Less than 1 μm | 30 μm or more | — | 0.34 | α | α | α |
| Comparative Example 1 | Mirror surface cutting | 0.012 | 0.087 | — | Less than 1 μm | less than 1 μm | 30 | 1 | γ | γ | γ |
| Comparative Example 2 | Mirror surface cutting | 0.012 | 0.087 | — | Less than 1 μm | less than 1 μm | — | 1.6 | γ | γ | γ |

EXPLANATIONS OF LETTERS OR NUMERALS

10 POLISHING APPARATUS
12 SHAFT
14 POLISHING MEANS
14a POLISHING ROLL
14b COATED ABRASIVE
16 SLURRY SUPPLYING MEANS
16a SLURRY SUPPLYING PIPE
16b NOZZLE
18 WASHING LIQUID SUPPLYING MEANS
18a WASHING LIQUID SUPPLYING PIPE
18b NOZZLE
20 ALUMINUM SUBSTRATE
20a OUTER PERIPHERY (PROCESSED SURFACE)
22 FINE PORES
24 OXIDE FILM
26 FINE PORE GENERATION POINTS
28 MOLD
30 ROLL-SHAPED MOLD
32 TANK
34 PNEUMATIC CYLINDER
36 NIP ROLL
38 ACTIVE ENERGY RAY IRRADIATION DEVICE
40 RELEASING ROLL
48 ACTIVE ENERGY RAY-CURABLE RESIN COMPOSITION
50 ARTICLE
52 FILM (ARTICLE MAIN BODY)
54 CURED RESIN LAYER
56 CONVEX PORTION
A REGION TO BE POLISHED
B POLISHED REGION

The invention claimed is:

1. A method for producing a mold for nanoimprinting, the mold having a concave-convex microstructure formed on a surface of a roll-shaped aluminum substrate in which the surface has been machined, the method comprising:
a polishing step of mechanically polishing the surface of the roll-shaped aluminum substrate in which the surface has been machined until at least an average crystal grain size changes; and
a concave-convex microstructure forming step of forming a concave-convex microstructure by anodizing the aluminum substrate after the polishing step.

2. The method for producing a mold for nanoimprinting according to claim 1, wherein the surface of the aluminum substrate is mechanically polished in the polishing step until the average crystal grain size becomes 1 μm or more.

3. The method for producing a mold for nanoimprinting according to claim 2, wherein the surface of the aluminum substrate is mechanically polished in the polishing step until the average crystal grain size becomes 5 μm or more.

4. The method for producing a mold for nanoimprinting according to claim 1, wherein the surface of the aluminum substrate is removed by a thickness of 1 μm or more in the polishing step.

5. The method for producing a mold for nanoimprinting according to claim 4, wherein the surface of the aluminum substrate is removed by a thickness of 3 μm or more in the polishing step.

6. The method for producing a mold for nanoimprinting according to claim 1, further comprising a surface finishing step of finishing the surface of the roll-shaped aluminum substrate simultaneously with polishing step or between the polishing step and the concave-convex microstructure forming step.

7. The method for producing a mold for nanoimprinting according to claim 1, wherein chemical mechanical polishing is performed in the polishing step.

8. The method for producing a mold for nanoimprinting according to claim 1, wherein a purity of at least the surface of the aluminum substrate is 99% or more.

9. The method for producing a mold for nanoimprinting according to claim 1, wherein in the concave-convex microstructure forming step, an anodizing step of anodizing the aluminum substrate to form fine pores and a fine pore diameter-increasing step of increasing diameters of the fine pores by dissolving at least a part of the fine pores are repeatedly performed.

10. The method for producing a mold for nanoimprinting according to claim 9, wherein a treatment time of the anodization is shorter than 5 minutes.

11. The method for producing a mold for nanoimprinting according to claim 9, wherein the anodizing step and the fine pore diameter-increasing step is are repeatedly performed 15 times or less in total.

* * * * *